United States Patent Office 2,708,428
Patented May 17, 1955

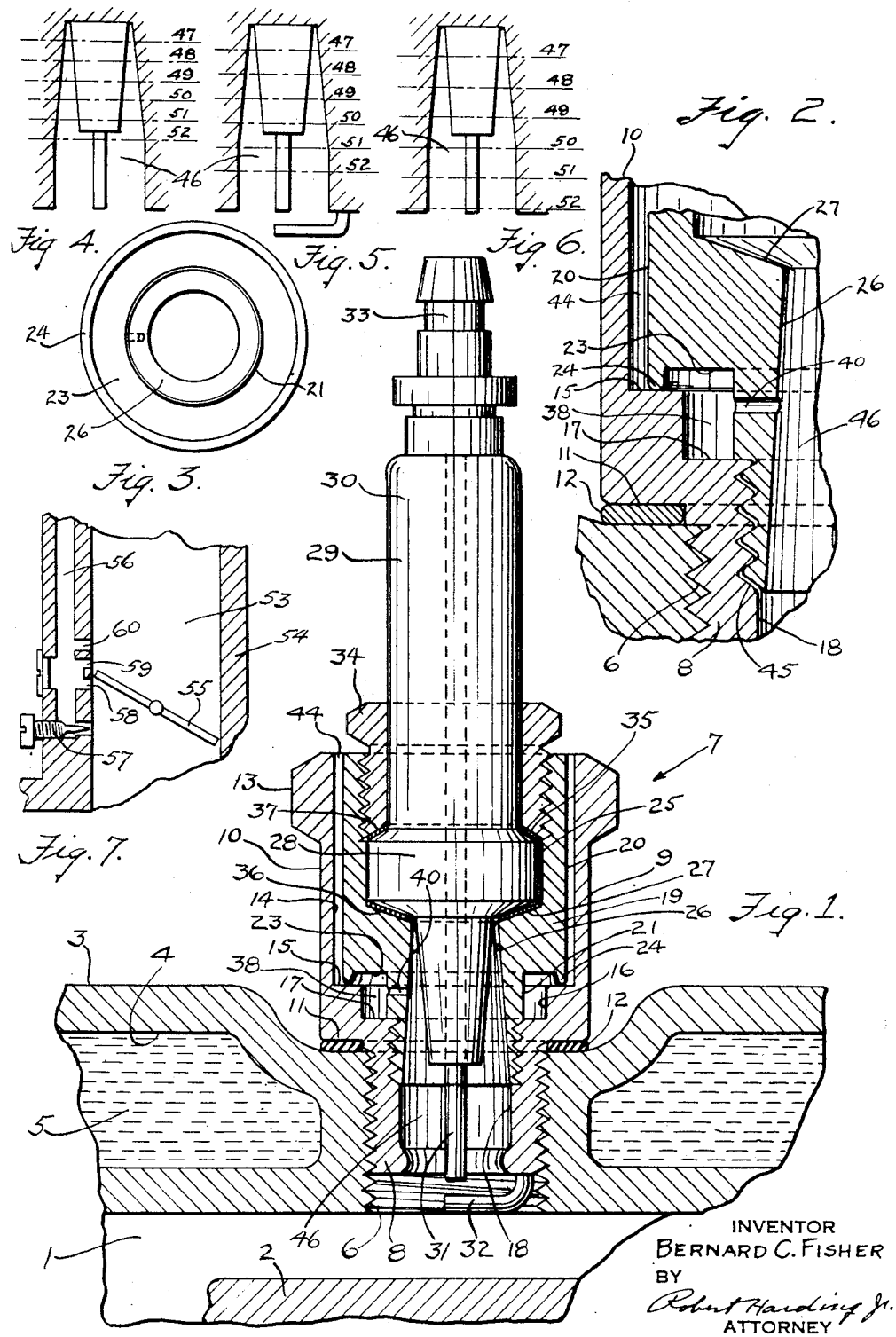

2,708,428

METHOD AND APPARATUS FOR CONTROLLING FLAME PROPAGATION IN INTERNAL COMBUSTION ENGINES

Bernard C. Fisher, Jersey City, N. J., assignor to Mary R. Fisher, Jersey City, N. J.

Application March 19, 1951, Serial No. 216,425

2 Claims. (Cl. 123—191)

This invention relates to internal combustion engines and especially to a means and a method for controlling the flame propagation in the combustion chambers of such engines.

This application is a continuation in part of my prior-filed applications, Serial No. 644,859, filed February 1, 1946, and Serial No. 752,165, filed June 3, 1947, now Patents No. 2,534,860 and No. 2,545,546.

It has always been extremely difficult in the operation of internal combustion engines to control the flame propagation in the combustion chambers thereof so as to get the maximum driving force against the pistons during the proper portion of the power cycle. Many attempts have been made to solve this problem without great success. Among these has been the practice of providing special fuel mixtures which act to delay the burning of the mixture, so as to distribute the explosive force over a larger portion of the piston's power stroke. Up to the present time these special fuel mixtures appear to give the best results.

I have discovered, however, that by a different manipulation and treatment of a portion of the fuel mixture for the engine during the time the fuel is introduced into the combustion space and compressed therein, I can control the flame propagation of the fuel mixture in a manner far better than has ever been done before and without the use of any special fuel mixtures, and I can accomplish this by the application to the engine of a simple, inexpensive device. In fact, my invention permits the use of fuels hitherto thought unsuitable for use in an internal combustion engine.

It is, therefore, the principal object of the invention to provide a method and a means for automatically controlling flame propagation in an internal combustion engine, so as to obtain a higher efficiency of the engine throughout wide ranges of speed and load variations than has been obtained heretofore.

Another object of the invention is to provide a method and means for admitting a fuel mixture into the combustion chamber and treating and confining this mixture adjacent the sparking electrodes in a predetermined manner during compression, so as to form a time delay in the initiation of the explosion but at the same time much more rapid, if not instantaneous, propagation of the flame during the actual explosion.

Another object of the invention is to provide a spark plug which when applied to an engine will permit the accomplishments of the objects in the last two paragraphs above.

A further object of the invention is to provide a means and a method for operating an internal combustion engine whereby the engine will operate cooler with less tendency for carbon to form in the cylinder and therefore with increased life for the plugs, valves, and associated parts.

The invention has been illustrated in the accompanying drawings in which:

Figure 1 is a sectional side elevation of a portion of a high compression engine designed for carrying out the invention;

Figure 2 is an enlarged, sectional, side elevation of a portion of the spark plug of the engine of Figure 1, showing the construction of the interior compartment;

Figure 3 is a bottom plan view of the inner barrel of the spark plug of Figure 1;

Figures 4, 5, and 6 are schematic sectional views of the firing space in the inner or electrode end of the spark plug of Figure 1 which may be used to illustrate the principles of the invention; and Figure 7 is a sectional view of a portion of a carbureter which may be used with the invention.

In carrying out the invention I force some of the fuel mixture, drawn into the combustion space of an internal combustion engine during the intake stroke, into a space adjacent the sparking electrodes and confine this portion of mixture during the compression stroke and treat it in a manner to be described, and I control the flame propagation of the explosive mixture in the cylinder by the proper configuration and size of this space in which the mixture is confined. I have found it convenient to provide this confining space in the spark plug of the engine, and I have, therefore, illustrated the invention in connection with an engine having a specially designed spark plug for carrying out the objects of the invention. I wish it to be understood, however, that the features of confining and controlling a portion of the fuel mixture need not be incorporated in the spark plug, but may, if desired, be a part of the engine head or may be furnished by means of an attachment thereto.

In forcing some of the fuel mixture into the aforementioned small space, I do so in such a manner that great turbulence of the mixture is produced and the mixture in this space is very finely divided, vaporized, and uniformly diffused. I then produce the usual spark at the electrodes which fires the diffused, explosive mixture in the confined space in a manner to be described and causes burning gases to rush out of the space, past the electrodes with a "blow torch" effect, firing the mixture in the combustion space substantially instantaneously at the proper time in the power stroke. The movement of gases at high velocity into and out of this space produces the desirable results explained hereinafter.

In Figure 1 I have shown an engine of the four cycle type having a cylinder 1 in which a piston 2 is mounted for reciprocation in the usual manner. The head 3 is provided with the usual compartments 4 for the cooling fluid 5, and in the top of the head is provided the usual tapped hole 6 for the specially constructed spark plug 7 which is provided with a cylindrical end 8 threaded to screw into the hole 6.

The spark plug 7 has a shell 9 formed of two different outer diameters, the smaller diameter portion forming the cylindrical end 8 and the remainder forming an open ended housing 10 for the components of the plug. A shoulder 11 is formed between these two portions and seats upon a gasket 12 when the plug is screwed into place for making a gas-tight connection with the engine. The outer end of the housing 10 is thickened and has its outer circumference formed into a hexagon nut 13 to which a wrench may be applied for screwing the plug into position.

The inner wall of the shell 9 has three portions of different diameters. The first portion 14 of largest diameter has a diameter only slightly smaller than the outside diameter of the housing 10 to form a thin wall for the housing. This first portion of the inner wall terminates in a shoulder 15 at the inner edge of which the second portion 16 of intermediate diameter commences. This portion 16 defines a portion of the interior compartment (to be later described), and is relatively short, terminating in a shoulder 17 at the inner edge of which the third portion 18 of the inner wall commences. This portion is enough smaller in diameter than the threaded end 6 of the shell 9 to provide sufficient strength for the cylindrical end 8 of the plug.

The end of the inner portion 18 adjacent the shoulder 17 is threaded to receive a barrel 19 the outer surface of which has portions of two different diameters 20 and 21, to conform generally in length and size to the portions 14 and 16 and 18, respectively, of the shell 9, the portion 21 being threaded to screw into one portion 18 of the shell 9.

Between the two portions 20 and 21 of the barrel 19 is a shoulder 23 the outer circumference of which has a rim 24 which extends axially of the barrel and bites into the metal of the shoulder 15 in the shell to form a gas-tight joint therebetween when the barrel is screwed into place.

The barrel 19 has a bore having two portions: an outer end portion 25 and an inner end portion 26 of reduced diameter at the junction with the portion 25 but increasing in diameter towards the end where the metal is relatively thin. Between these two portions is provided a sloping shoulder 27 against which is seated the enlarged central portion 28 of the spark plug insulator 29 which may be of the usual design and may be made of porcelain or other suitable ceramic, having an elongated cylindrical post 30 extending outwardly of the plug from the enlarged portion 28 and tapering to a smaller diameter from the enlarged portion towards the inner end of the plug, terminating at a point somewhat within the inner end of the barrel 19.

The insulator 29 has the usual small diameter bore extending through it from end to end in which is cemented the central electrode 31 of the spark plug. This electrode terminates at its inner end just about even with the inner end of the shell 9, in the example illustrated, and cooperates with a grounded electrode 32 which is welded to the end 8 of the shell 9 and extends diametrically towards the center of the plug with its end spaced slightly from the end of the electrode 31 so as to provide a gap for a spark to jump.

The other end of the central electrode 31 terminates in a cap 33 which may be of the usual design for attaching the wire to the plug from the distributor of the engine.

A gland nut 34 is threaded into the open outer end of the barrel 19, the outer end of the portion 25 of the bore being threaded for that purpose. The inner end 35 of the gland nut is tapered to conform to the tapered surface of the enlarged portion 28 of the insulator 29, so as to hold the insulator in place when the nut is screwed into place, suitable soft metal washers 36 and 37 being provided adjacent the shoulder 27 and the tapered end 35 of the nut 34, to make a gas-tight joint.

The portion 16 of the inner wall of the shell 9 is enough larger in diameter than the outer diameter of the portion 21 of the barrel 19 to provide a compartment 38 between the shoulders 17 and 23 which connects with the interior of the portion 26 of the barrel by means of a duct or ducts 40. The compartment 38, together with the interior 26 of the barrel 19, forms the confining space referred to above.

The diameter of the portion 20 of the barrel 19 is slightly smaller than that of the portion 14 of the shell 9 so as to provide a space or duct 44 through which air may circulate to aid in cooling the plug.

In the example shown in Figures 1 to 3, there are two passages or ducts leading from the interior compartment 38 to the combustion space of the engine; one is the duct 40 and the other is formed by the normal clearance between the threaded portions of the barrel and the shell. These threads are standard U. S. metric threads with normal clearance for a running fit, but there is enough clearance between the outside diameter of the thread on one part and the root diameter of the thread on the other part to provide a helical duct (indicated at 45 in Figure 2), of sufficient cross section for my purpose.

In general I believe the operation of the engine and plug assembly shown in Figures 1 to 3 to be as follows:

During the suction stroke a mixture of gasoline and air is drawn into the cylinder in the usual manner. Because of the high velocity of air through the carbureter, this mixture, as is well known, is not completely atomized and therefore is not uniform, but passes into the cylinder in layers of air and various mixtures of air and gas. During the compression stroke some of this mixture of air and gas passes into the compartment 38. This mixture enters the compartment 38 through the ducts 40 and 45. Because of the helical shape of the duct 45, formed by the threads on the end 21 of the barrel, the mixture entering the compartment 38 through this duct is given a circular swirling motion, and the contact of this mixture with that coming directly through the duct 40 produces great turbulence in the compartment 38. Because these ducts have a very small cross section, two effects are produced. First, friction with the walls of the ducts acts to increase the molecular activity and break up any droplets of fuel existing in the mixture, and this action is aided by the heat in the metal surfaces which is sufficient to vaporize any liquid coming into contact with the walls, resulting in a thoroughly mixed and more nearly perfect combustible mixture in the compartment 38. Second, the metal surfaces of the ducts are cooled by virtue of giving up heat to the fuel mixture which passes through them at high velocity, resulting in a cooler operating plug.

At the end of the compression stroke the combustion chamber of the engine is filled with a compressed, spotty, mixture of air and more or less raw fuel, arranged in layers, while the compartment 38, the ducts 40 and 45, and the space 46 within the lower end of the barrel 19, all of which together may be hereinafter called "the firing space" 46', are filled with a much more perfect explosive mixture.

In order to explain what I believe takes place during the compression and power strokes, the firing space 46', defined by the cylindrical end 8 of the shell 9 and the inner end of the insulator 29, and the compartment 38 together with ducts 40 and 45 have been represented diagrammatically in Figures 4, 5, and 6. The following theory of operation has been developed after many experiments and careful study of the results obtained.

At the end of the intake stroke a fresh mixture surrounds the electrodes including the firing space 46. As the compression stroke starts, the mixture surrounding the electrodes is forced back into the space 46. This mixture continues to compress in the compartment 38, the ducts 40 and 45, and in the space 46, the mixture passing through the ducts and being finely divided and vaporized, as already explained. At the end of the compression stroke the arrangement of fuel mixture in the space 46 is somewhat as indicated in Figure 5. A very highly explosive mixture has been forced into the innermost portion of the space 46 and into the compartment 38 and various gradations of a mixture of this highly explosive mixture and the normal fuel mixture will be arranged between that point and the point where the spark occurs at the tips of the electrodes. Thus, the most perfect explosive mixture may exist in the space between the inner end of the space 46 and the dot-and-dash line 47; a slightly poorer mixture may extend from that line to the dot-and-dash line 48; a still poorer mixture may extend between the dot-and-dash lines 48 and 49; and similarly the mixtures between the lines 49 and 50, between the lines 50 and 51, and between lines 51 and 52, will be progressively poorer; while from line 52 to the end of the center electrode there may be a mixture closely approaching the normal mixture in the rest of the combustion space.

The spark, occurring on or before the end of the compression stroke, finds the stratification of gas mixture somewhat as thus outlined. It ignites the mixture at the electrodes and the flame begins to spread away from the electrodes in all directions. This burning of the mixture is relatively slow and an increment of time elapses before the edge of the flame front reaches the line 52 in the space 46, but as the flame front approaches this line, the rate of burning increases and the flame front then moves faster and faster. As the flame front passes beyond the line 52 into regions of more and more perfect mixtures, it will finally reach a point where the rate of burning becomes substantially instantaneous. While I do not know exactly where this point is, it may be assumed for the purpose of this explanation to be at the line 49. At this point then, the nearly perfect mixture is instantaneously consumed, creating such a sudden expansion of the gases that the flame, with no other place to go, is forced out of the firing space 46 like the flame of a blow torch and into every corner of the combustion chamber, igniting the mixture therein at points which would normally not have been reached at this time by the expanding flame front. The "blow torch" effect thus causes substantially instantaneous burning of the rest of the mixture in the combustion chamber, and when the stratification of the various grades of mixture is correct, a smooth pressure is applied to the piston during the most effective part of its power stroke and the combustion of fuel is substantially complete, with resulting increase in engine efficiency.

In the ideal timing of the flame propagation the force of the expanding gases against the piston should start from zero as the piston leaves the innermost dead center position, increase sinusoidally to a maximum as the piston passes its halfway position, and decrease sinusoidally to zero again at the innermost dead center position. By means of my invention I approach much nearer to this ideal condition than has been done before with any engine of which I am aware.

The force of the explosion creates an extremely high pressure in the combustion chamber which forces unused or burned gases back into the farthermost crevices of the space 46, including the ducts 40 and 45 and the compartment 38.

At the proper time, at the end of the power stroke, the exhaust valve opens and the burned gases rush out of the combustion chamber, aided by the piston which has begun to move into the cylinder again. When the exhaust valve opens, the pressure within the combustion chamber drops far below the extremely high pressure created therein by the explosion. Since the gases in the compartment 38 are under this much greater pressure, some of them will be forced through the ducts 40 and 45 and through the space 46 into the combustion chamber. These gases flush the burned gases out of the space 46 and away from the electrodes 31 and 32 again producing a cooling effect upon the electrodes and associated parts. Again turbulence is created by the fact that the gases emerge from the two ducts in a circular swirling motion from the duct 45 and in a deflected stream from the duct 40. When the exhaust valve closes at the end of the exhaust strike, the cycle is ready to be repeated again with another intake stroke.

Consider now what will happen when load and speed conditions of the engine change. Assume for a predetermined condition of load and speed that the region in the firing space 46 which the flame front has to reach before the "blow torch" effect is obtained is represented by the line 49. Suppose now that the load is increased as, for instance, in an automobile, when the automobile starts to climb a hill, and that this condition is met by opening the throttle for supplying more fuel to the engine. Since more fuel mixture enters the cylinder at the intake stroke, the compression in the cylinder will rise and it will be seen that the various gradations of the mixture of fuel and air will be squeezed farther into the space 46, so that now the lines 47 to 52 may assume the positions indicated in Figure 4. Thus it will now take longer for the flame front from the spark to reach the region of line 49 and the ignition is effectively retarded, which is what is desired when the load is increased, as is well known.

If the load should decrease and a smaller amount of fuel be admitted by the throttle, the compression also decreases, thus permitting the stratified fuel mixture to spread out in the space 46 with the result that the line 49 may now be much closer to the spark, as indicated, for instance, in Figure 6, requiring less time for the flame front to reach it and thus effectively advancing the ignition, which is again what is desired for this condition.

Now assume again that the normal conditions prevail which produce the effect indicated in Figure 5 and that the speed of the engine increases. This will cause less fuel mixture to enter the cylinder, because the time for it to get in becomes less, and the compression will therefore decrease and the lines 47 to 52 will spread out bringing the line 49 nearer the electrodes, as indicated in Figure 6, and thus effectively advancing the ignition, which again is what is desired under this condition.

Decreasing the speed has the opposite effect, increasing the compression aagin and crowding the stratified mixture into the space, as indicated in Figure 4, thus effectively retarding the ignition.

It will be seen that the position of the critical region of stratified fuel mixture will be governed by a number of factors. These are: (1) the normal compression in the cylinder at the end of the compression stroke; (2) the normal engine speed; (3) the size of the firing space 46; (4) the shape of the firing space 46; and (5) the character of the explosive mixture admitted to the firing space 46.

The shape and size of the space 46 and the character of the explosive mixture admitted to the space may be controlled for any given engine. I have found that a convenient shape and size may be determined by the inner end of the spark plug, and I control the character of the mixture admitted by the size of the ducts and the arrangement of the compartment 38.

The embodiment of the invention illustrated in the figures is suitable for use in an automobile engine equipped with the usual controls for advancing and retarding the spark and having a normal compression of 110 pounds per square inch, provided certain adjustments in carburetion and ignition are made. These adjustments will be described later. Good results have been obtained when the various dimensions were as follows:

Threads on shell to fit engine=14 millimeters x 1¼ millimeters.
Internal diameter of end of shell 9=.2813 inch.
Internal diameter of shell 9 at portion 18=.355 to .360 inch.
Internal diameter of barrel at end of 26 adjacent shoulder 27=.263 to .271 inch.
Diameter of inner end of insulator=.1625 inch.
Diameter of inner end of insulator adjacent enlarged portion=.2188 inch.
Distance of electrode gap to end of barrel 19=.31 inch.
Threads on barrel forming duct 45=10 millimeters x 1 millimeter.
Pitch diameter of thread=.3675 to .3642 millimeter.
Distance from end of barrel to compartment=.1875 inch.
Width of space 44 between barrel 19 and shell 9=.004 to .008 inch.
Gap between electrodes=.018 to .040 inch.
Spacing of distributor points=.0015 to .0120 inch.
Tapered angle of lower end of barrel=5%.

Because more power is produced for a given throttle setting, there is an increased velocity of air through the carbureter, with the result that the balance of air and fuel is upset. It may therefore be necessary to reduce the flow of fuel from the pump to the carbureter in the neighborhood of 50% for a standard engine, and it is also necessary to lessen the flow of fuel through the carbureter in the neighborhood of 50% which may be accomplished by changing the air bleeds.

The flow of gas through the carbureter may be properly balanced by the addition of another air bleed, as shown in Figure 7. In this figure the throat 53 of the carbureter 54 is shown with the throttle valve 55 pivotally mounted therein. The idle circuit duct 56 is shown with the low idle adjustment 57 at the bottom and the idle intermediate discharge holes 58 and 59 immediately above it. To produce the desired effect, the upper hole 59 may be enlarged, or an additional air bleed hole 60 placed above it. In any case the air bleeding effect of the idle discharge holes should be increased. The extent of the increase will depend on the general characteristics of the engine. This prevents the liquid level in the high speed circuit from lowering because of the excessive vacuum produced by the increased power when the invention is used.

I have also found that in a normal engine using the invention the spark advance may also be reduced about 50%, which can be conveniently done by reducing the weights on the centrifugal control.

On new motors, full advantage of the invention may be taken by changing the valve timing so as to reduce the overlap of the intake and exhaust valve openings. With my invention it is not necessary to open the exhaust valve before the piston reaches the bottom of its stroke or to keep the intake valve open after the piston has started up at the end of the intake stroke.

I have found that in adjusting the engine incorporating the invention for optimum operation, it is best to set the timing in accordance with standard practice and then advance the setting until the most power is obtained without preignition. When properly adjusted, an automobile can start at ten miles an hour at the bottom of a 30 degree grade and, with the throttle wide open, pick up speed smoothly and without preignition or detonation. If the car fails to pick up speed, the setting of the spark should be advanced; if preignition occurs, the setting of the spark should be retarded.

Best results have been obtained with "regular" gasoline, that is, gasoline which has not been treated with tetraethyl lead or the like.

The results obtained with the invention are startling. I have found after repeated tests that the mileage per gallon of any automobile can be increased substantially, in some instances as much as 100% over the mileage stated by the manufacturer to be the standard mileage of the car.

In addition to the increase of mileage which comes with the practice of the invention, other phenomenal results are obtained. These may be listed as: increased power and therefore increased acceleration; cooler operation of the engine, and especially cooler operation of the spark plugs with accompanying long life thereof; slower idling speed for the engine with much smoother operation than with ordinary engines; much less tendency for carbon to form in the cylinder or around the electrodes of the plug, since the combustion is substantially complete, and therefore less fouling of plugs and valves.

In addition to these advantages the whole engine may be designed to incorporate the invention with the result that the compression may be raised; a longer stroke may be used with no less revolutions per minute; and there need be no limit to the bore of the cylinder. Heretofore, gasoline engines have been limited to a six inch diameter bore. Beyond that diameter the combustion becomes very inefficient. With the use of the invention, however, the efficiency of engines with bores larger than six inches can be increased several hundred per cent. Also an engine designed in accordance with the invention permits the use of a smaller cooling system than is required with the ordinary engine and a lower powered ignition system.

While the use of the invention in connection with a four cycle engine has been described in detail, it will be understood that the invention is by no means limited to any particular type of engine, but may be used wherever a more accurate control of flame propagation is desired.

Modifications of what has been shown and described may be used without departing from the spirit of the invention and I do not wish to limit myself except by the appended claims.

What I desire to claim and secure by Letters Patent is:

1. In an internal combustion engine, a cylinder defining a combustion chamber, a piston reciprocally mounted therein, sparking electrodes adjacent a wall of said cylinder for firing the fuel mixture therein at predetermined times in the engine cycle, space defining means cooperating with said piston for segregating a portion of said fuel mixture in a space adjacent said electrodes during the compression stroke, means including a compartment adjacent said space-defining means and a duct connecting said compartment with the end of said space farthest from said sparking electrodes for predetermining gradations of fuel mixture in said space at the end of said compression stroke with the most explosive mixture farthest from said electrodes, whereby the rate of flame propagation is adjusted in accordance with operational variations of the compression, and a second duct between said compartment and the end of said space adjacent said electrodes, which duct is greatly restricted and tortuous, whereby gases are finely divided and thoroughly intermixed as they pass into and out of said cavity.

2. A spark plug comprising a body member, means at one end of said member for attaching said member in the cylinder head of an internal combustion engine, electrodes at the same end of said member providing a spark gap, said body member having a cavity communicating with the space adjacent said gap and on the opposite side of said gap from the combustion chamber of said engine, a compartment in said body portion having a duct leading into the outer end of said cavity, said duct having a relatively small cross section as compared to the size of the cavity, said compartment being large enough to contain burnable combustion mixture and small enough so that the compression in said cylinder will be substantially unaffected, the configuration and size of said cavity, the cross section of said duct, and the configuration and size of said compartment being such that stratification of the normal fuel mixture of the gas introduced through said duct will occur in said cavity during the compression stroke of said engine, so as to control the flame propagation in the combustion chamber thereof, said body member being formed of two telescoping parts having threaded engagement at the inner end of the spark plug, said parts being relatively displaced beyond said threaded portions to define the compartment and the threaded connection between said parts providing a tortuous, restricted duct between said compartment and the inner end of said cavity.

References Cited in the file of this patent

UNITED STATES PATENTS

| | | |
|---|---|---|
| 1,360,392 | Glaze | Nov. 30, 1920 |
| 1,555,718 | Schroeder | Sept. 29, 1925 |
| 1,719,705 | Kondo | July 2, 1929 |
| 1,870,981 | Auzin | Aug. 9, 1932 |
| 2,003,822 | Brewster | June 4, 1935 |
| 2,127,512 | Harder | Aug. 23, 1938 |
| 2,149,261 | Anderson | Mar. 7, 1939 |
| 2,166,930 | Gehres | July 25, 1939 |
| 2,191,638 | Adams, Jr. | Feb. 27, 1940 |
| 2,360,390 | Berstler | Oct. 17, 1944 |
| 2,456,080 | Wupe | Dec. 14, 1948 |